United States Patent [19]
Erdahl et al.

[11] Patent Number: 5,699,497
[45] Date of Patent: Dec. 16, 1997

[54] RENDERING GLOBAL MACRO TEXTURE, FOR PRODUCING A DYNAMIC IMAGE, AS ON COMPUTER GENERATED TERRAIN, SEEN FROM A MOVING VIEWPOINT

[75] Inventors: Alan C. Erdahl; John A. Robinson, both of Salt Lake City, Utah

[73] Assignee: Evans & Sutherland Computer Corporation, Salt Lake City, Utah

[21] Appl. No.: 613,893

[22] Filed: Mar. 11, 1996

Related U.S. Application Data

[63] Continuation of Ser. No. 197,957, Feb. 17, 1994, abandoned.
[51] Int. Cl.⁶ .................................................. G06T 15/00
[52] U.S. Cl. ................................ 395/128; 395/119; 395/130
[58] Field of Search ................................. 395/119, 120, 395/128, 130; 364/410; 434/30, 37–44; 273/351

[56] References Cited

U.S. PATENT DOCUMENTS

| | | | |
|---|---|---|---|
| 4,343,037 | 8/1982 | Bolton | 364/521 |
| 4,586,038 | 4/1986 | Sims et al. | 340/729 |
| 4,692,880 | 9/1987 | Merz et al. | 364/521 |
| 4,727,365 | 2/1988 | Bunker et al. | 340/728 |
| 4,780,084 | 10/1988 | Donovan | 434/2 |
| 4,807,158 | 2/1989 | Blanton et al. | 364/521 |
| 4,821,212 | 4/1989 | Heartz | 364/521 |
| 4,855,934 | 8/1989 | Robinson | 364/521 |
| 4,952,922 | 8/1990 | Griffin et al. | 340/729 |
| 4,974,176 | 11/1990 | Buchner et al. | 364/52 |
| 5,097,427 | 3/1992 | Lathrop et al. | 395/130 |
| 5,222,205 | 6/1993 | Larson et al. | 395/130 |
| 5,317,689 | 5/1994 | Ncak et al. | 395/163 |
| 5,480,305 | 1/1996 | Montag et al. | 434/2 |
| 5,495,563 | 2/1996 | Winser | 395/130 |
| 5,579,456 | 11/1996 | Cosman | 395/119 |

Primary Examiner—Phu K. Nguyen
Assistant Examiner—Rudolph Buchel
Attorney, Agent, or Firm—Thorpe North & Western, LLP

[57] ABSTRACT

A dynamic terrain display is created from digitized grid post data as a height field, that is textured using maps embracing progressively larger areas with increasing remoteness from the viewpoint. A truncated pyramid is defined by map parts for each level that are maintained in active memory. The map parts or fragments are stored in rectangular configurations to be updated row-by-row or column-by-column, by overwriting obsolete data in a circular manner to reflect changes in the viewpoint. Levels of the map parts accordingly are paged independently of each other from database storage. Not all levels are required to have texture in that if a level is not available, a lower level can be employed. Theme cells also can be utilized.

14 Claims, 9 Drawing Sheets

RENDERING GLOBAL MACRO TEXTURE, FOR PRODUCING A DYNAMIC IMAGE, AS ON COMPUTER GENERATED TERRAIN, SEEN FROM A MOVING VIEWPOINT

This is a continuation of prior application Ser. No. 08/197,957 filed Feb. 17, 1994, now abandoned.

FIELD OF THE INVENTION

The present invention relates to a system with improved memory organization for generating real time dynamic images on a display device representative of large-surface perspective scenes, such as the terrain beneath an aircraft.

BACKGROUND OF THE INVENTION

Over the years, significant advances have been made in the field of computer graphics. In one field of application, by utilizing an extensive data source, dynamic pictures can be displayed, for example, revealing a traversed terrain as it would appear from a moving aircraft. Typically, an image generator functions in conjunction with a cathode-ray-tube (CRT) display system to provide such dynamic images, visually simulating an actual flight experience. Such graphics systems have been widely used in simulators for visually training pilots or other operators.

Utilizing one graphics technique, a computer image generator combines elevation and texture data to drive a display that reveals dynamic perspective images. While practical systems have been accomplished, a need continues to exist for improved systems of greater economy and capable of providing displays that are substantially void of unwanted artifacts. That is, in relation to the generation of dynamic terrain images, a need exists for a system for organizing and selectively paging portions of an extremely large continuous terrain map with a reasonably sized active memory while assuring that map data is available as needed.

Generally, elevation and planimetric data for use by an image generator to provide a dynamic terrain display is organized as a rectangular-coordinate field, e.g., a height field of digitized grid post data. The height field may consist of elevation samples arrayed at coordinate points in a rectangular grid aligned with X-Y datum. Elevation values at coordinate X-Y points then manifest heights (Z) of the terrain or skin. With a terrain representation so defined, it can be processed to obtain data for individual picture elements (pixels) of a display in relation to a selected viewpoint. The data can be computed in eye space to generate a basic form that is textured, shaded and scan converted for the display. However, a practical difficulty of such systems involves anti-aliasing (getting rid of the unwanted artifacts created by the projection process).

With regard to texturing, an effective solution to the aliasing problem involves the use of so-called "MIP" maps of different texture resolutions for the same area. Although traditional MIP map techniques are effective for texturing certain objects, a difficulty arises in attempting to texture terrain polygons. That is, because terrain is a continuous surface, made up of many relatively small polygons, requirements are for either an extremely large number of texture maps or one extremely large texture map. Small maps create problems in matching the texture across all the boundaries. Generally, in accordance herewith, an extremely large continuous terrain texture map is organized and paged in such a manner as to require only a reasonable amount of active memory and to assure the availability of texture data. In an unconventional format, as described in detail below, for each projected area of an image, depending on distance from the viewpoint, forms of MIP maps are selected and interpolated to derive the intensity and color components.

SUMMARY OF THE INVENTION

The system hereof involves utilizing active memory to contain select portions of terrain data as needed for creating an image from a current eye point. It is recognized that only the areas surrounding the eye point can have any effect on the viewed image, and in that regard, the highest level texture map (the map with the most detail) need only be available for the immediate area. As the projected pixel size increases relative to the projected map texture element (texel) size, lower level maps are used.

In the creation of quality displays, the ratio of the projected pixel size to the projected texture element (texel) size must be maintained within certain limits. Accordingly, serious aliasing of the image can be prevented. Essentially, the active portions of each level map, that is, the parts that may be needed at any instant, may be the same size. Accordingly, with increasing distance from the viewpoint, a larger area is embraced by texels but less detail is provided. Thus, substantially the same amount of data is involved for levels of each map. Thus, a series of texture maps are maintained available, as to represent various distance levels, each of which has the same number of texels but embraces an area of a different size with a compensating reduction in detail.

In accordance herewith, extensive height field data and texture data are paged from storage into active memory for use by an image generator and a display unit, for example, to provide a dynamic image of passing terrain from a moving viewpoint. Active level maps are updated by row and column reflecting movement of the viewpoint, with terrains (or other objects) textured accordingly. If a specific level map is not available, data from other levels is used, or theme cell data may be employed. Thus, an effective and economical system is attained for quality displays.

BRIEF DESCRIPTION OF THE DRAWINGS

In the drawings, which constitute a part of the specification and in which like reference numerals indicate like elements, an exemplary embodiment of the present invention exhibiting various objectives and features thereof is set forth. Specifically.

DESCRIPTION OF THE PREFERRED EMBODIMENT

As indicated above, a significant aspect of the system of the present invention is based on recognizing that it is possible to predict or anticipate those portions of an extensive terrain texturing map that will be needed for creating an image from any specific viewpoint or eye point. Accordingly, the disclosed system exemplifies creating a terrain display from a digitized grid post and texturing the display using a plurality of prepared maps (somewhat distinct from conventional MIP maps) of different resolution for the same area. Some basic considerations of the graphics processing will be presented initially.

Figure 1:
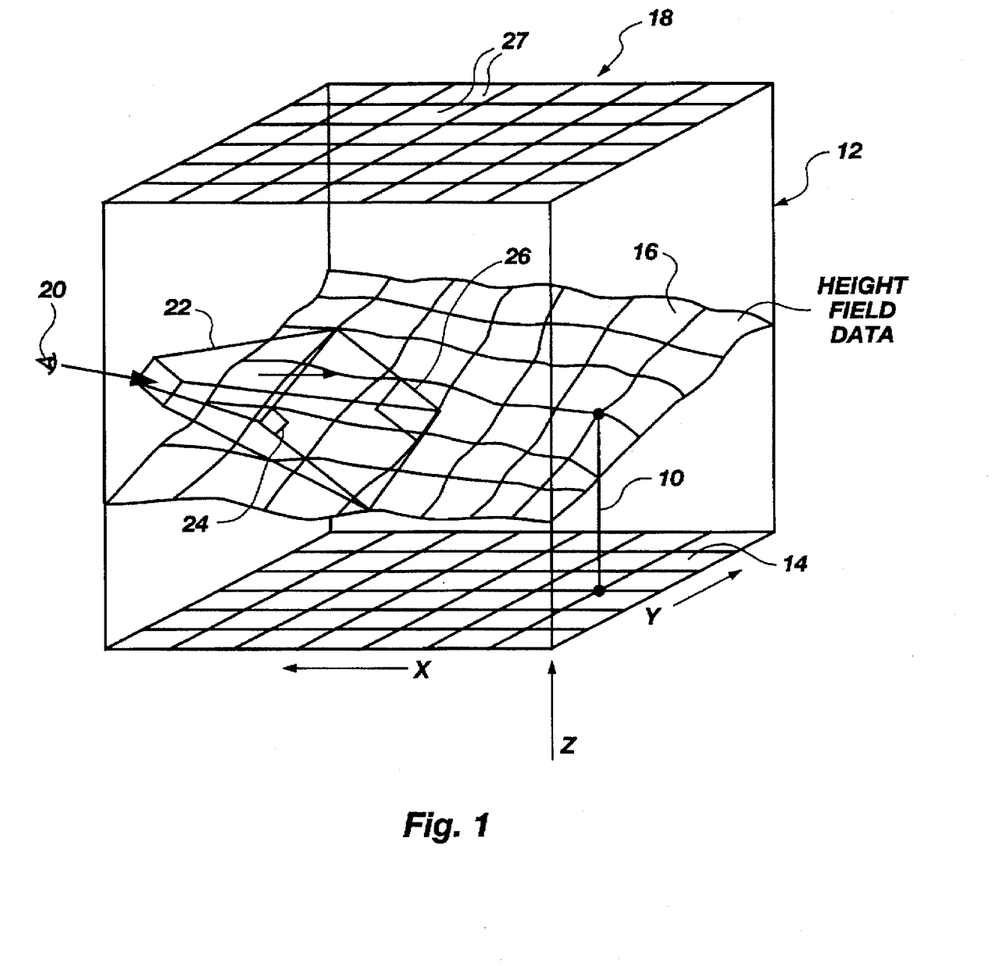
FIG. 1 is a diagrammatic illustration of a height field related to a viewpoint and texture mapping.

In FIG. 1, a rectangular fragment of a height field or digitized grid post is shown in a cube 12 and exemplified by a single vertical line 10 extending from a reference grid 14 to a skin 16 representing a continuous terrain or surface. The grid 14 is designated in X (east) and Y (north) coordinate dimensions, with the height dimension indicated in terms of Z. It is to be understood that FIG. 1 is a graphic illustration, not to scale or in proportion, but rather distorted and fragmentary in the interests of simplification and explanation.

While the fragment 12 showing the skin 16 is illustrative, it is to be understood that height field data will exist from an eye point or viewpoint 20 out in all directions to the extent of the modeled range. However, the illustrated fragment 12 will illustrate the manner in which a represented texture map 18 is projected onto the skin 16 to attain an enhanced and effective image display.

The skin 16 is displayed in relation to the selected viewpoint 20, a rectangular component of the view being represented by a pyramid of vision 22. In that regard, systems are well known in the art wherein texture from a map, e.g., the map 18, is projected onto a skin, as the skin 16, to accomplish a realistic display. For example, see U.S. Pat. No. 4,985,854, entitled METHOD FOR RAPID GENERATION OF PHOTO-REALISTIC IMAGERY, Jan. 15, 1991, Wittenburg.

In accordance herewith, the viewpoint 20 is selected and data is processed to provide a dynamic image showing a changing terrain for the moving viewpoint 20, as would appear from an aircraft. Generally, rays (not shown) extend from the viewpoint 20 to the skin 16 to define individual picture elements (pixels). Utilizing various techniques, the pixels are processed to impart form, texture and shading in a composite display. Such operations are disclosed in U.S. patent application Ser. No. 08/137,907 entitled DIRECT RENDERING OF TEXTURED HEIGHT FIELDS, Michael A. Cosman, hereby incorporated by reference herein.

As illustrated in FIG. 1 and as described in detail below, the area of the terrain or skin 16 embraced by a pixel varies with remoteness from the viewpoint 20. As stated above, scales and size relationships are somewhat disregarded in FIG. 1; however, at opposed corners of a pyramid of vision 22, pixel areas 24 and 26 are represented impinging the terrain or skin 16 at significantly different distances from the viewpoint 20. Specifically, the pixel area 24 is much closer to the viewpoint 20 than the pixel area 26. Accordingly, it will be apparent that the area 24 is smaller than the area 26. Thus, it will be appreciated that pixels representative of areas on the skin 16 will embrace larger areas with remoteness from the viewpoint 20. That is, the size of an area represented by a pixel will vary with the distance from the viewpoint 20 to the terrain skin 16. A related consideration involves texturing the terrain areas with the texture map 18.

Generally, detailed texture elements 27 (texels) of the texture map 18 are not appropriate for pixel areas of all ranges. That is, as indicated above, one detailed texture map is not appropriate for pixels of all sizes (embracing areas of different size). Consider the texture map 18 in greater detail.

The texture data, represented by the map 18, consists of an array of data that describes the surface (intensity and color) of the skin 16 at regular positions of the grid 14 in terms of X-Y coordinates. In that sense, the map 18 is much like the height field defining the skin 16, and some processes that are applicable to process the height field also may be used to process the texture map.

The purpose of the texture map 18 is to "paint" the skin 16 in detail to be representative of a terrain in the display. Accordingly, as indicated, it is desirable that the texture space be of higher resolution than the height field. As explained above, with progressive remoteness from the viewpoint 20, it is appropriate to sacrifice detail in the texture as the embraced area of pixels grows. Such operations have been implemented using techniques of so-called "MIP" maps. The initials "MIP" stand for "multum in parvo", Latin for "many things in a small space". Essentially, reference is to the fact that each simpler, coarser representation of the data for texturing a more remote area is the result of filtering the previous matrix of data to eliminate changes that cannot be represented at the coarser resolution. The filtering process averages or smoothes the high-frequency detail to derive a more slowly varying representation that can be adequately represented with fewer samples. A detailed treatment of MIP strategy and its implementation is disclosed in a publication entitled *Computer Graphics*, Volume 17, No. 3, Jul. 1983, specifically in an article by Lance Williams entitled "Pyramidal Parametrics".

Essentially, MIP map techniques involve storing a number of maps, each of a different resolution for the same area. For each projected pixel area of an image, depending on its remoteness from the viewpoint, an interpolation is made from the maps to derive intensity and color components. As the projected pixel size increases relative to the projected map size, lower level, that is, less detailed, maps are used. However, difficulty arises in utilizing the conventional techniques for applying texture to terrain polygons.

Generally, from a large disk storage, texture MIP maps are loaded, map by map, into active working memory as they are needed. Because terrain is a continuous surface, and is treated as many relatively small polygons, the operation requires either an extremely large number of basic texture maps or one extremely large map. In general, as disclosed below, the present system organizes and pages MIP maps constituting portions of an extremely large continuous terrain map so as to require only a moderate amount of active memory and to assure that the map portions needed are available at any time.

As indicated above, the system is based on the realization that it is possible to anticipate and select those portions of a terrain texture map that are needed for creating the image from a given eye point. Essentially, only those areas surrounding the viewpoint have any effect on the image. The highest level MIP map (the map with the most detail) need only be available for the area out to, say one thousand feet. The next level map embraces a distance out to two thousand feet, and the next level map to four thousand feet and so on. The reason is that as the projected pixel size increases relative to the projected map texel size, lower level MIP maps are used.

Figure 2:
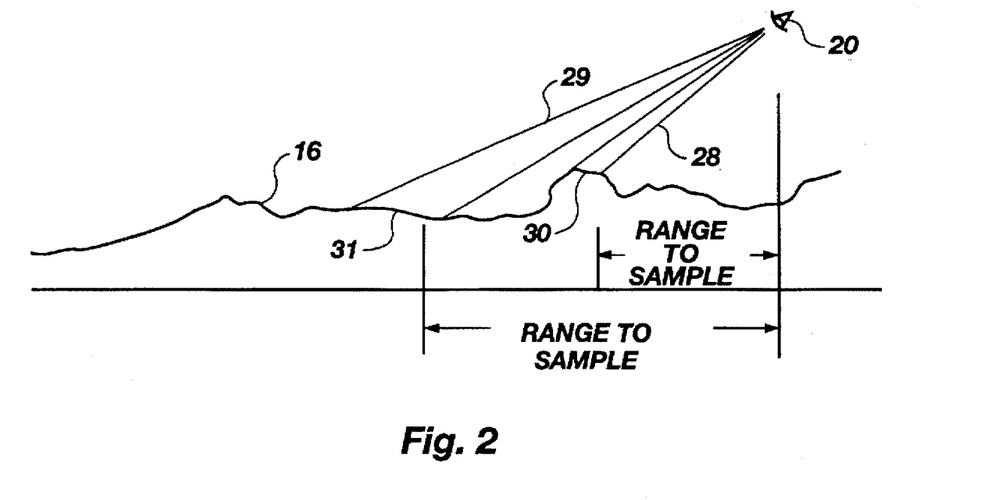
FIG. 2 is a vertical section diagram illustrating a terrain profile in relation to a viewpoint for graphics display.

The ratio of projected pixel size to projected texel size must be maintained within certain limits to prevent serious aliasing (introducing unwanted artifacts) in the image. Consequently, as disclosed below, the active portion texel for each level (MIP map) of the composite map is the same size. The varying area embraced by a texel, but with oppositely varying detail, results in the same amount of data for texels of different map levels. Reference will now be made to FIG. 2 for further explanation of the sampling operation.

Essentially, rays are extended from a viewpoint to the height field skin 16 for defining individual pixels. In FIG. 2, view triangles 28 and 29 illustrate the projection embraced by a pair of rays from the viewpoint 20 to the terrain skin 16. The bases 30 and 31 of the triangles 28 and 29, respectively, indicate the pixel areas to be represented. Note as explained above, the base 31 is larger than the base 30 as a result of the greater distance to the viewpoint 20. It should be noted that the range from the eye point to the surface establishes an "upper limit" on the texture level map to be used. As the orientation of the surface becomes more oblique, a lower level of texture map will be used. That is, the appropriate level of the texture map is determined by the ratio of the projected pixel size to the projected texel size. This ratio is a function of both range from the eye point and the surface orientation to the eye point.

Figure 3:
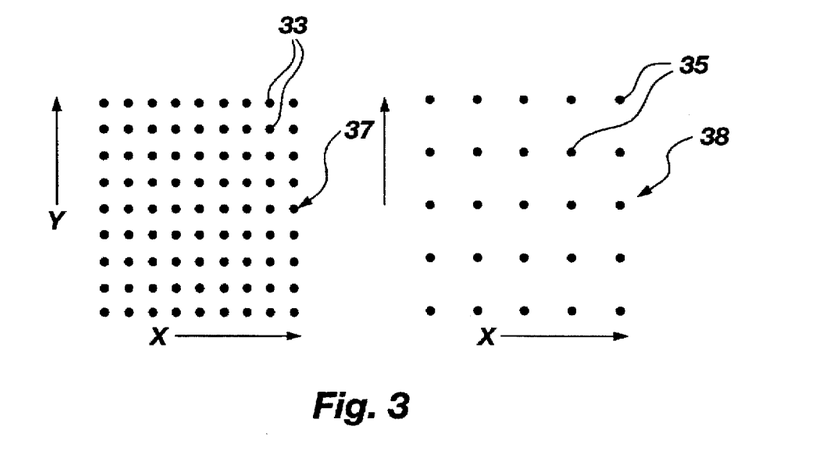
FIG. 3 is a graphic representation of sample picture element (pixel) patterns as occur in accordance herewith.

FIG. 3 shows a sectional image-space view through sampling rays 33 and 35. In a sense, FIG. 3 is somewhat a sectional view through rectangular patterns 37 and 38 of rays 33 and 35 as would be centered in the projection triangles 28 and 29, respectively. Accordingly, the spacing of the patterns 37 and 38 illustrates the enlarged area embraced by pixels as distance increases from a viewpoint.

Figure 4:
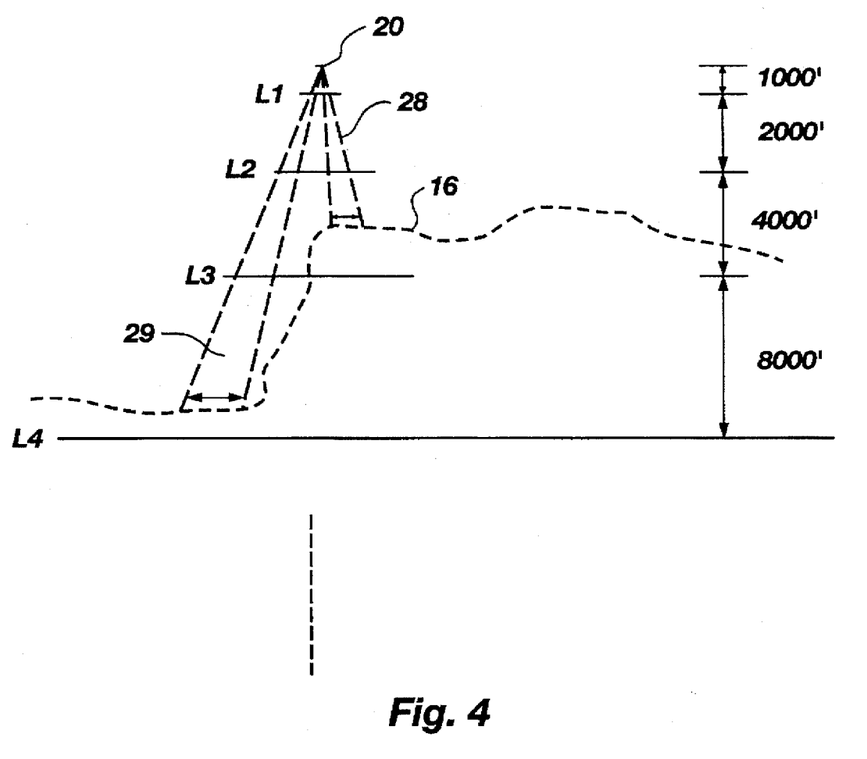
FIG. 4 is a diagrammatic vertical sectional view illustrating texture mapping in relation to distance in accordance herewith.

In FIG. 4, the skin 16 is shown as a profile from a different angle to illustrate vertical extensions of view triangles 28 and 29 from the viewpoint 20. The triangles 28 and 29 are shown to extend vertically to simply illustrate an exemplary positioning of map levels L1, L2, L3 and L4 for texture maps of varying detail. For example, the map L1 is displaced from the viewpoint 20 by a distance of one thousand feet. Beyond the map level L1, levels are displaced as follows: level L2—two thousand feet, level L3—four thousand feet, level L4—eight thousand feet and so on.

Figure 5:
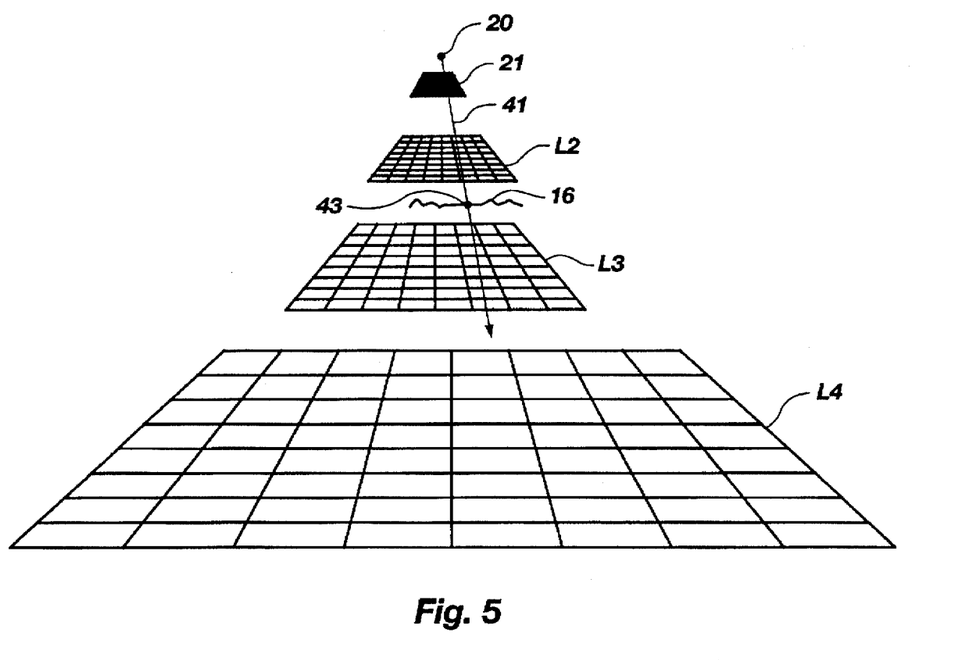
FIG. 5 is a perspective view illustrating multiple exemplary texture maps as used herein.
Figure 6:
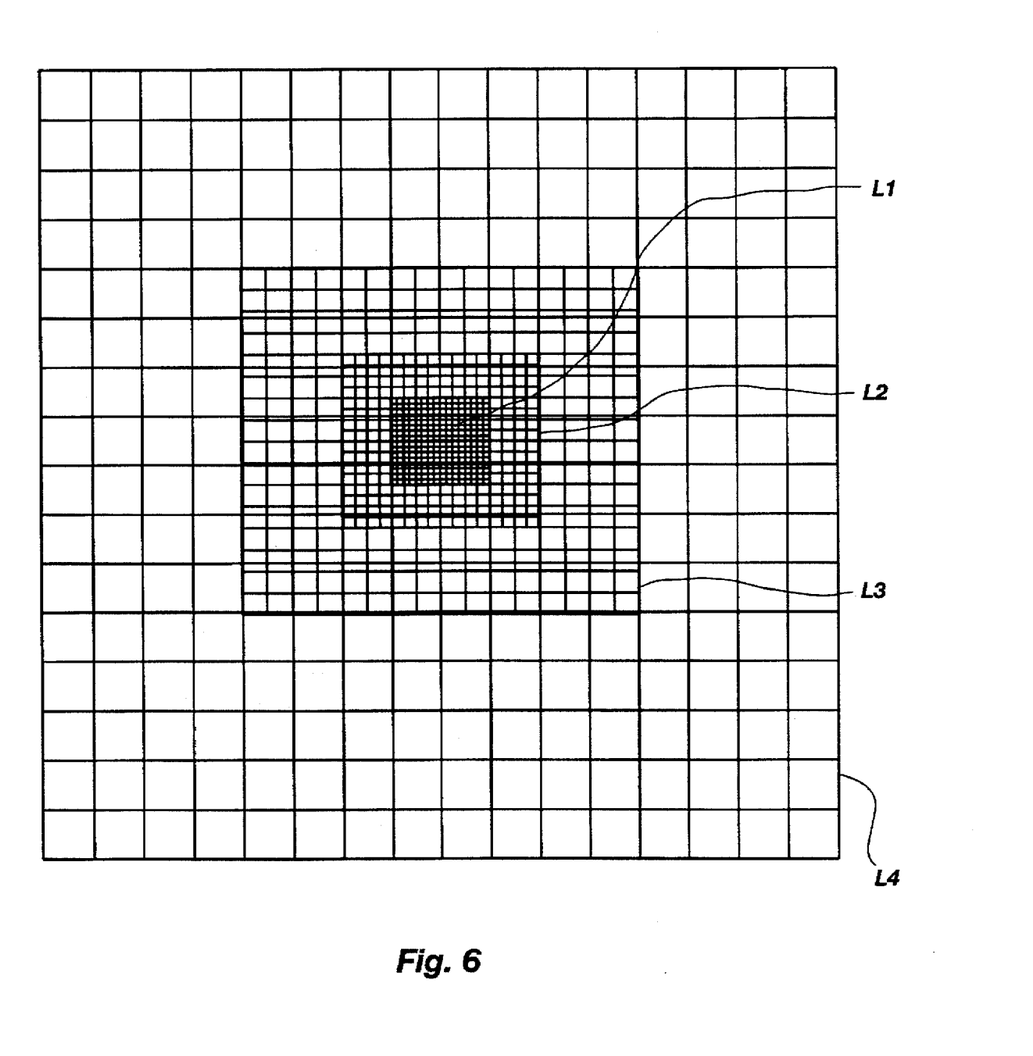
FIG. 6 is a top plan view of the maps of FIG. 5.

As indicated above, the varying detail maps at each level progressively embrace a larger area but provide less detail. Stated another way, along with the pixels, the texels of each map increase in size resulting in coarser representations. Somewhat enlarged, FIGS. 5 and 6 illustrate rectangular arrays of texels for maps of levels L1–L4 (FIG. 4). It is to be understood that the basic height field and texture database (in disk storage) are very extensive, however, only portions of each are carried in active memory, as described below. FIGS. 5 and 6 illustrate representative level maps L1–L4 that are simplified and compromised for purposes of explanation. Though greatly reduced in texels represented, for purposes of explanation, the drawings can be thought of as showing active portions of level maps L1–L4 currently contained in active memory. Incidentally, in one operating embodiment hereof, twenty-two layers of map resolutions are maintained. Each of the first twelve layers contain approximately one million texels (1024×1024). The remaining level maps contain fewer texels as described below, as the viewpoint moves, data is paged to replace rows and/or columns in the grid maps.

Referring to FIG. 5, a ray 41 is shown extending from the viewpoint 20 through the maps L1 and L2 to intersect the profile of terrain 16 at a point 43. Accordingly, the point 43 specifies a pixel area that is to be textured by interpolating as between the maps L2 and L3, the map levels being derived and stored from the texture database fragmentarily represented by the texture map 18 (FIG. 1). In that regard, as explained in the above referenced patent application, Ser. No. 08/137,907, polygons are marked for global texture and on the basis of X-Y coordinates of the vertices and texture is mapped from conventionally identified U, V coordinates. Accordingly, texture is applied to the polygons on a pixel-by-pixel basis to accomplish data for a display. In that regard, to texture the pixel designated by the ray 41, the operation of the present system involves interpolation between texels of the map levels L2 and L3.

Extending from the eye point 20 (FIG. 7) to the terrain 16, the ray 41 pierces the texels 54 and 56. Note that the texel 56 embraces a substantially larger area than the texel 54; however, note that the texel 54 is more detailed. Accordingly, as indicated above, the texels 54 and 56 may contain substantially similar amounts of data.

Figure 7:
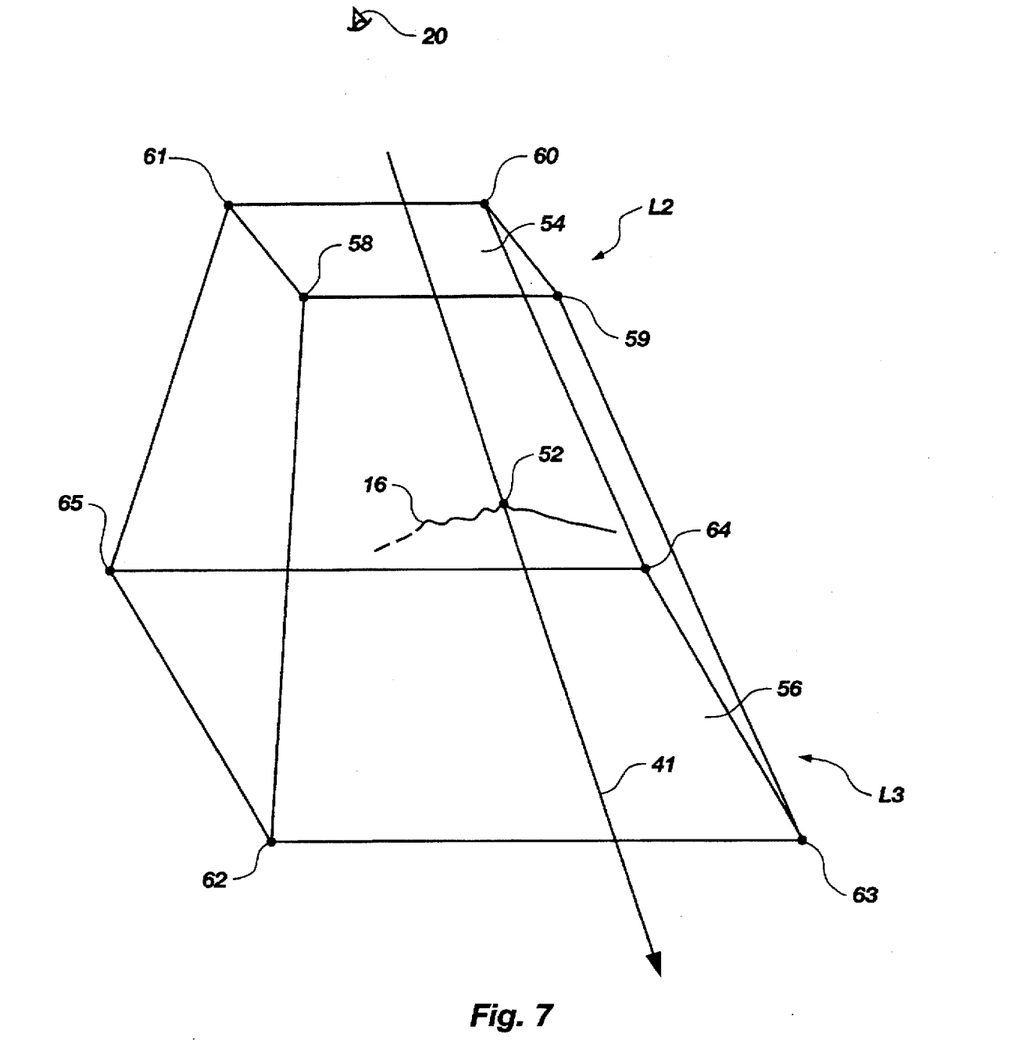
FIG. 7 is a diagrammatic perspective view of components of the maps of FIG. 5.

The consequence of processing the terrain intersection point 52 (lying between the maps L2 and L3) is an interpolation involving the four surrounding coordinate corners or points of the texels 54 and 56 at the two map levels, specifically points 58, 59, 60 and 61 of the texel 54 in map L2 and points 62, 63, 64 and 65 of the texel 56 in map L3. Interpolation (usually but not necessarily linear, as well known in the art) is used to calculate a texture value from the eight surrounding values of the points 58–65. Accordingly, a value (intensity and color) is determined for texturing the pixel identified by the impact point 52.

Figure 8:
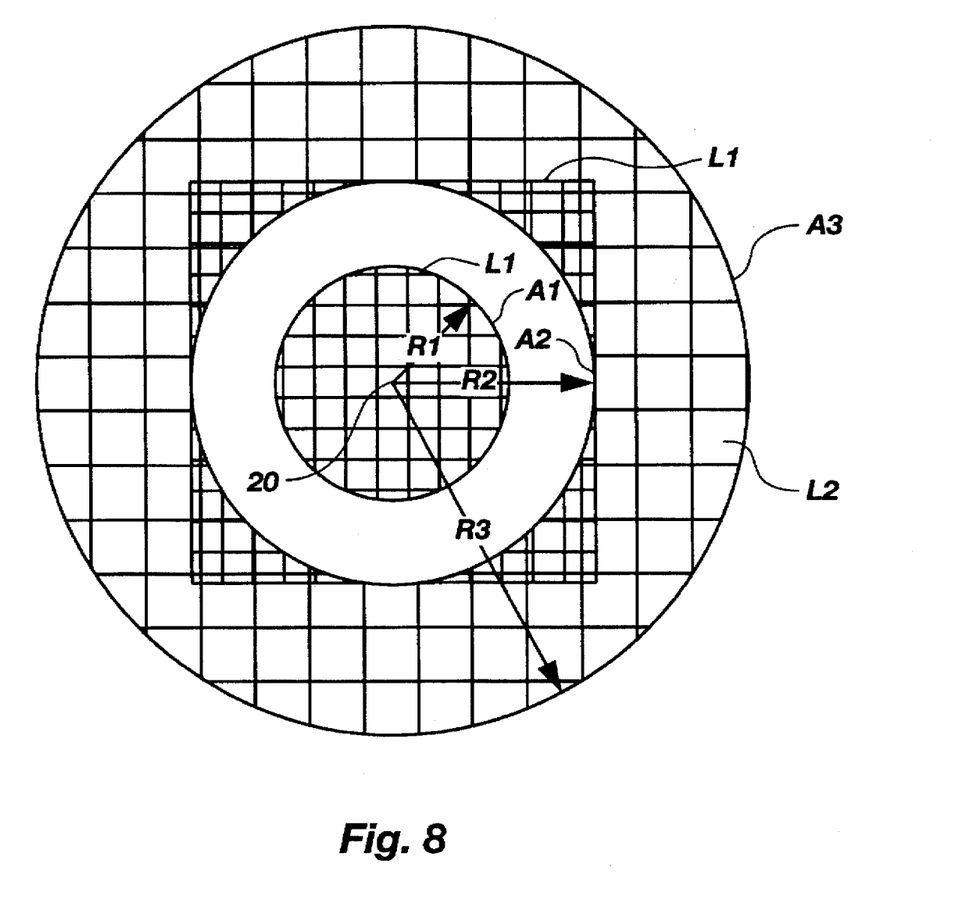
FIG. 8 is an enlarged circular fragment of FIG. 6, illustrating exemplary texture mapping operations in accordance herewith.

Summarizing interpolation operations in view of the above, different levels or maps L1–Ln are involved depending on the distance from the terrain pixel to the viewpoint. Showing a plan view of texture maps L1 and L2 above a terrain, FIG. 8 illustrates the demarcations. Specifically, the map L1 (highest level of detail) is applied to the extent of a range R1 as illustrated by a vector. Beyond the range R1 to a range R2, transition occurs from the map L1 to the map L2 utilizing interpolation techniques. As illustrated, a lower level of detail is then introduced between the ranges R2 and R3. Thus, the ranges R1, R2 and R3 define annular rings A1, A2, A3 that are aligned within the maps L1 and L2. Essentially, the corners of the square maps L1–Ln complete grid arrays for the convenience of paging data into active memory as will be explained in detail below. Note that the corner data is used if the eye point moves such that the data falls within the annular ring.

Recapitulating to some extent, extensive texture maps L1–Ln are carried in active memory for a terrain. As indicated, the different level maps are maintained in active memory for an area about the viewpoint 20. As explained above, the viewpoint 20 may be exemplified as an aircraft in flight. In such an instance, maps are maintained indicative of the terrain currently visible beneath the aircraft. Thus, the active terrain texture maps reflect the terrain (represented by the height field data) beneath the aircraft. Currently relative height field data also is paged into active memory for processing in terms of polygons as well known in the prior art. However, the texture data is far more dense than the height field data. Consequently, the demands attendant texture data are far greater than for height field data. Consequently, in accordance herewith, various arrangements can be utilized. For example, height field data can be paged into active memory using the same techniques as described below for paging texture map data, or various known paging techniques can be employed for the height field data in view of the lesser volume.

As indicated above, generally, in accordance herewith, texture data is paged by columns and rows of texels into arrays defined in active memory to be available as needed. In that regard, recognize that it is possible to predict which portions of terrain map are needed for creating the image from any given viewpoint.

Referring again to FIG. 5, symbolically the eye point or viewpoint 20 may take the form of an aircraft traversing a terrain represented by the height field data (skin 16, FIG. 1) and correlated to the level maps L1–Ln (FIG. 5). As the aircraft moves with respect to coordinates of the grid 14 (FIG. 1), fresh terrain is introduced along with related fresh texture data. Accordingly, the system maintains a traveling envelope of active data in memory including height field data and terrain texture data in the form of level maps L1–Ln. The system of paging data into memory for maps L1–Ln in accordance with movement of the viewpoint 20 will now be considered with reference to FIG. 9.

Figure 9:
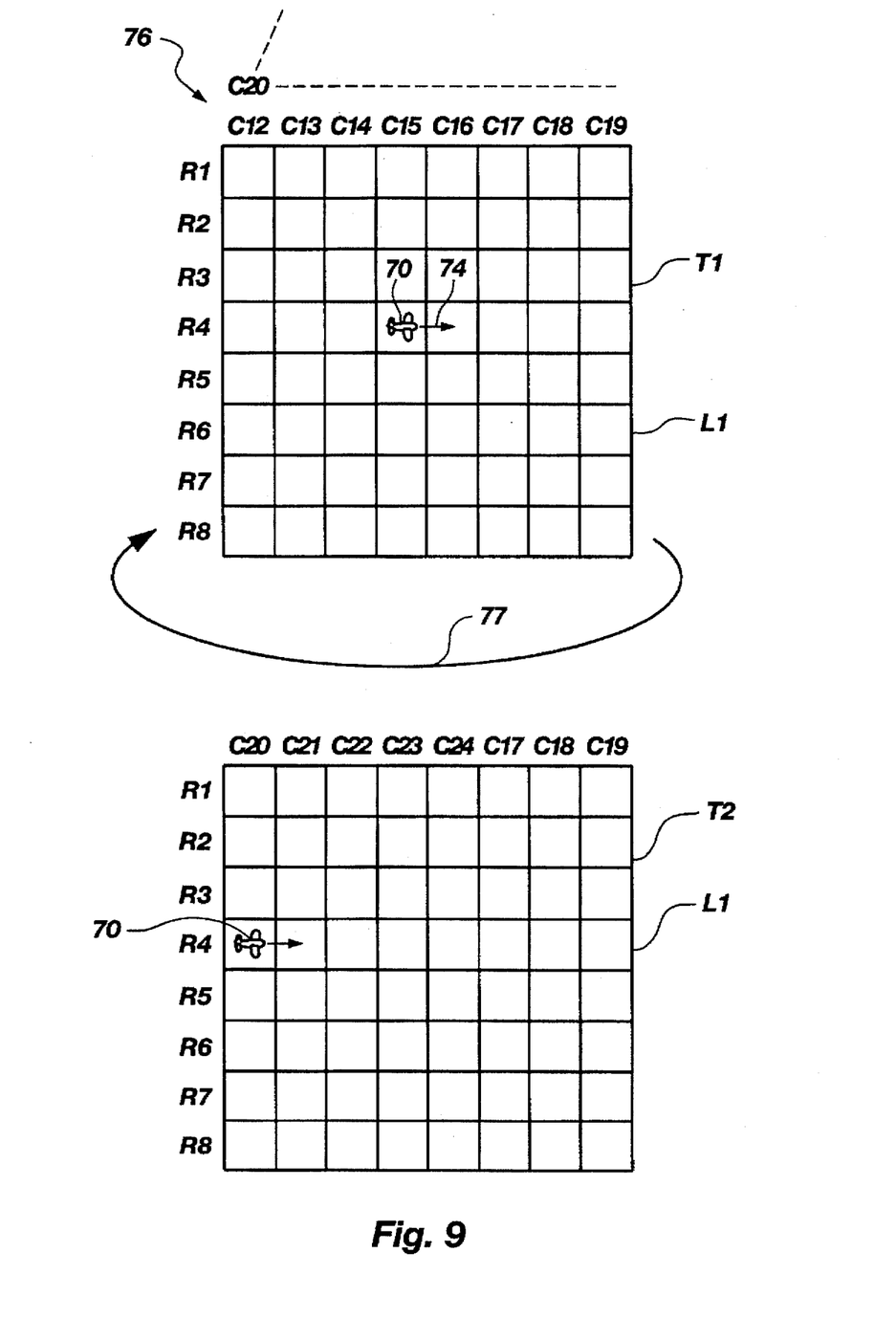
FIG. 9 is a chart illustrating exemplary data paging into active memory in accordance herewith.

The viewpoint 20 (FIG. 5) is symbolized in plan view with respect to the level map L1 by an aircraft silhouette 70 (FIG. 9). Specifically, two representations of the map L1 are shown, designated at times T1 and T2, reflecting two different points in the travel of the aircraft 70 over the coordinate grid. Note that the active level map L1 is simplified indicating only an eight-by-eight grid of sixty-four texels.

Essentially, the representations at times T1 and T2 illustrate the contents of active memory for the map L1 at two distinct times, coinciding to specific positions of the viewpoint 20 symbolized by the aircraft 70. Texels in maps represented at the times T1 and T2 are designated by column and row, specifically, columns C12 through C19 and rows R1 through R8. The representation of time T1 locates the aircraft 70, traveling to the right in row R4, at column C15. Accordingly, in the representation of time T1, a forward view from the aircraft 70 encompasses the texels located in columns C16, C17, C18 and C19. Consequently, those texels are utilized to map the terrain as explained and illustrated above. Of course, data for each of the other level maps L1–Ln are similarly available, and, as indicated above, a substantially greater number of texels likely would be present in an operating system.

By keeping track of a reference viewpoint on the map, e.g., the coordinate locations of aircraft 70, to update the texel array, new data simply is written over the prior data in active memory at locations furthest behind the eye point. No other data in the maps needs to be changed. As the eye point is moved through the database, data automatically is paged to maintain the eye point (aircraft 70) in the center of the active texture maps.

Because the next to the highest level map has texels representing twice the area of the highest level, it need be paged only half as often. The third level map need be paged only one-fourth as often as the highest level map and thus all levels can be paged in twice the time required for the highest level map only. Consequently, ordinary disk bandwidths are fast enough to move through the basic database accommodating travel of a very fast aircraft. The paging operation will now in considered in further detail.

As the aircraft 70 moves from the column 15 to the column 16, as indicated by an arrow 74, the texels of column 12 become obsolete. Accordingly, in the memory space, column C12 is replaced by a fresh column of texels, specifically, column C20, as indicated by the charge 76. Consequently, in representing a forward display from the aircraft 70 (now in column C16) the texels of columns C17, C18, C19 and C20 are available. A wrap-around arrow 76 indicates the path. Thus, fresh columns are paged into memory maintaining the pertinent terrain data accessible for computing a representative view from the aircraft 70.

Assume now that from a time T1 to a time T2, the aircraft 70 has moved forward (left to right) from column 15 through the columns C16, C17, C18 and C19, with the result that forward views are provided utilizing texels as indicated in the following chart.

| CHART 1 | |
|---|---|
| VIEWPOINT (AIRCRAFT 70) LOCATION (COLUMN) | FORWARD VIEW TEXELS |
| C15 | C16, C17, C18, C19 |
| C16 | C17, C18, C19, C20 |
| C17 | C18, C19, C20, C21 |
| C18 | C19, C20, C21, C22 |
| C19 | C20, C21, C22, C23 |
| C20 | C21, C22, C23, C24 |

When the aircraft 70 moves from the column C19 to the column C20, a wrap-around operation occurs as illustrated in the representation for time T2. Accordingly, the aircraft 70 appears in the column C20 with forward view texels available from the columns C21, C22, C23 and C24. Thus, depending on the displacement of the aircraft 70 (eye point), fresh columns or rows are paged into active memory, written over old data and are readily available for texturing height field images. As will be apparent, flight paths diagonal to the grid maps L1–Ln will result in paging both columns and rows of fresh data to maintain pertinent texture information available.

Figure 10:
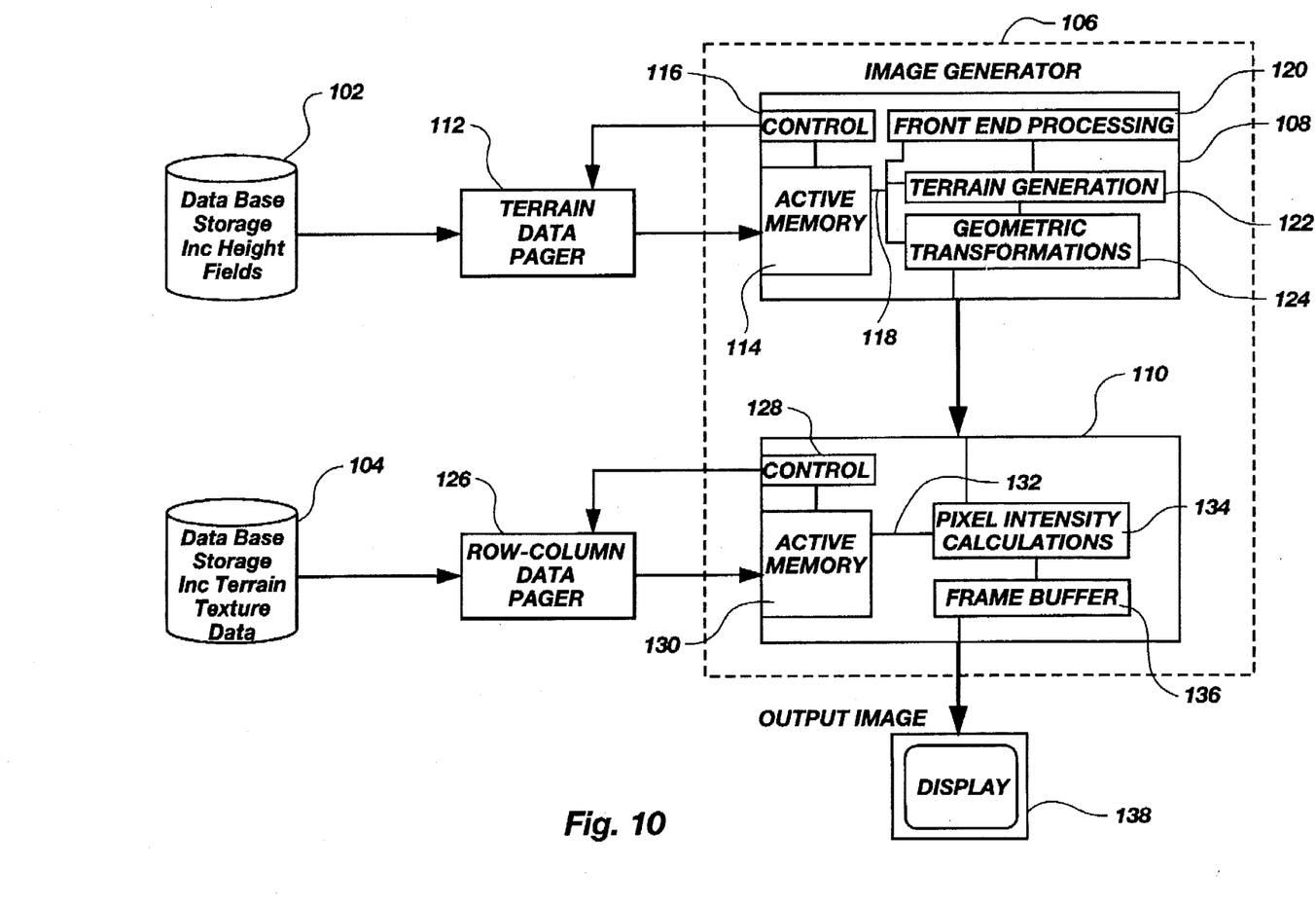
FIG. 10 is a block diagram of a system in accordance herewith for executing the operations as illustrated in the above-mentioned FIGURES.

In view of the above descriptions of processing operations attendant the disclosed system, an embodiment of the system will be now be considered with reference to FIG. 10. A comprehensive height-field database (FIG. 1) is contained in a storage 102 (left, FIG. 10) while a texture database is contained in a storage 104. Generally, the storage 102 contains an extensive height field defining an extremely large area of terrain. Data for texturing the terrain, in one form or another, is contained in the storage 104.

The texture data may take the form of texture maps as explained above or may involve theme data accommodating the use of theme cells to construct texture data in accordance with previously proposed systems. A theme cell texturing system is disclosed in U.S. patent application Ser. No. 08/088,447 entitled IMAGE TEXTURING SYSTEM HAVING THEME CELLS, Michael Cosman and Thomas Brown, hereby incorporated by reference. Essentially, in theme cell texturing, texture is synthesized based on characteristics and generic terrain.

With regard to the system of FIG. 10, it is to be understood that the storage units 102 and 104 may be variously implemented and alternatively, a single storage structure or disk may be utilized. Generally, in accordance herewith, height field data and texture data of current interest (depending on eye point location) is selectively paged into active memory within an image generator 106. Accordingly, data is preserved accessible for a moving eye point to maintain a dynamic display.

The image generator 106 may take a multitude of different forms; however, for the disclosed embodiment, a front end processor 108 and a pixel processor 110 are illustrated. The division is imposed for purposes of illustration and it is to be understood that a single processor or various other arrangements could accomplish both operations.

Typically, the front end processor 108 accomplishes the traversal of the database, performs field of view culls, level of detail determination and geometric transformations. Such operations are well known in the field of computer graphics, for example, see the book *Fundamentals of Interactive Computer Graphics*, Foley and Van Dam, Addison-Wesley Publishing Co., 1984, also, Principles of Interactive Computer Graphics, Newman and Sproull, McGraw-Hill Book Company, 1979. In the final analysis, the front end processor 108 generates the terrain skin from height field data.

The pixel processor 110 (back end of the image generator) performs the occultation, and the intensity/color calculations for each pixel of the display. The texturing of features and terrain is part of the process. In that regard, an important consideration in accordance herewith, is that texture can be applied to any non-vertical surface, e.g., building tops, airport runways, parking lots and so on. The operation is not limited to surface terrain.

Considering the system of FIG. 10 in greater detail, height field data is fetched from the storage 102 by a data pager 112 for placement in an active memory 114 of the front end processor 108. The pager 112 is controlled by the front end processor 108 to maintain data of current interest available to the operating subsystems. Specifically, an active memory 114 is maintained and utilized by a control 116, coupled through a bus 118 to a front end processing unit 120, a terrain generation unit 122 and a geometric transformation structure 124. Signals indicative of the accomplished transformations are supplied from the front end processor 108 to the pixel processor 110 for further processing.

Terrain data of current interest is fetched from the storage 104 by a data pager 126 under control of the pixel processor 110. Specifically, a control 128 actuates the data pager 126 to maintain texture data of current interest in an active texture memory 130 organized and maintained as explained with reference to FIGS. 5, 6 and 9. So organized, the memory 130 is coupled through a bus 132 to a pixel intensity calculation unit 134. Processed pixels comprising a data image are developed in the frame buffer 136 utilizing processes as well known in the art. Pixel data from the frame buffer 136 provides an output image to a display unit 138.

In the operation of the system, a viewpoint 20 (FIGS. 2 and 3) is maintained in the front end processor 108 of the image generator 106. From the stored viewpoint 20, projected rays define pixels for a desired image. Accordingly, terrain form is computed from the height field (FIG. 1). Height field data for such calculations are preserved in the active memory 114 as explained above. With the terrain representations developed, appropriate signals are supplied to the pixel processor 110 (FIG. 10) for pixel calculations including texturing operations. As explained above, texture data is maintained in the active memory 130 by the data pager 126 writing fresh column or row data as illustrated with reference to FIG. 9. Accordingly, data of current interest is preserved in active memory. The maintenance of the active memory 130 in accordance herewith and as described above affords an effective basis for texturing global terrains. Maintaining current MIP type maps in the active memory 130 as illustrated in FIGS. 5 and 6, is effective, as illustrated in FIG. 9. Note that the texture maps as described herein, for different levels, include texels of increasingly greater area. As stressed above, moving from the viewpoint, the texels progressively embrace larger areas, however, are less detailed. Thus, the volume of data is somewhat balanced.

Utilizing the appropriate data map levels, texture data is interpolated as explained with reference to FIG. 7, to accomplish the final color and intensity for each pixel of a display as accumulated in the frame buffer 136. Accordingly, frame-by-frame, composite images are completed in sequence for a dynamic display by the unit 138.

It is to be appreciated that in the operation of the system, texture data may not always be available at every level for a given terrain. In instances where higher levels of detail are not available, lower levels may be adapted to accomplish satisfactory images. In the event that actual texture data is not available for an area, theme cell operation may be employed as disclosed in detail in the above-referenced patent application, IMAGE TEXTURING SYSTEM HAVING THEME CELLS. Accordingly, a combination of techniques may be employed combining theme cells with terrain data to accomplish a composite display.

Another consideration involves the multitude of possible variations in the system. For example, a system may well utilize either one or many processors configured in a parallel mode where each of the processors do all of the tasks for a part of the scene or a part of the database. Similarly, as indicated above, the database storage may be variously contained and arranged as may the pagers. Accordingly, in view of the possibilities, the scope hereof should be determined with reference to the claims as set out below.

What is claimed is:

1. A computer graphics system for producing a dynamic image of a continuous textured surface, as global terrain seen from a moving viewpoint, utilizing height field data or other two-dimensional terrain field representations and texture data comprising terrain storage for storing said terrain field representation data;

texture storage for storing at least a first level and a second level of texture data, said first level providing a greater texture resolution of said terrain, said second level providing a lesser texture resolution of said terrain;

an active map memory system coupled to said texture storage for storing a first portion of said first level and a second portion of said second level, said first and second portions containing a common plurality of said texels, both arranged in rectangular arrays, said first portion and second portions relating to areas of said terrain having a common center corresponding to said viewpoint, but said first portion spanning a smaller surface area about said common center and said second portion spanning a larger surface area about said common center;

a paging structure coupled to said active map memory system for selectively paging fresh texture data from said texture storage to said active map memory system in accordance with said moving viewpoint, said paging structure paging in said texels from said first level to said first portion at a faster rate and paging in said texels from said second level to said second portion at a slower rate, while maintaining said common plurality of texels in each of said actively-stored portions;

an image system for processing said terrain representation data from said terrain storage and said selectively stored portions of texture data from said active map memory system to provide image data signals; and display means for providing said dynamic image in accordance with said image data signals wherein said active map memory system stores said actively-stored portions of said levels of texture as a truncated pyramid and said image system applies texture from said levels of texture data in accordance with ranges defined by annular rings relating projected pixel size to projected texel size.

2. A system according to claim 1 wherein said range determines an uppermost map level for texturing said surface.

3. A computer graphics system for producing a dynamic image of a continuous surface, as global terrain seen from a moving viewpoint utilizing height field data or other two-dimensional terrain field representations and texture data for said terrain, said image defined by a plurality of concentric circular ranges of different texture resolution, said system comprising:

terrain storage for storing said terrain field representation data;

texture storage for storing said two-dimensional texture data comprising a plurality of independent texture map levels having varying texture resolution for said terrain;

an active map memory system coupled to said texture storage for selectively storing a common plurality of selected texels from said texture map levels, said actively stored texels from said levels being commonly configured in N×M rectangular arrays with N rows and M columns, but said arrays for different levels having progressively lesser texture resolution for progressively greater rectangular surface areas relative to arrays of adjacent levels, said surface areas spanning increasing distances from a common center coinciding with said viewpoint;

a paging structure coupled to said active map memory system for selectively paging fresh texture data from said texture storage to said active map memory in accordance with said moving viewpoint, said paging structure independently accessing said different levels for paging in fresh rows or columns of texels to said respective N×M rectangular arrays at different rates for different levels while maintaining said arrays in said common plurality of texels said fresh rows or columns of lesser texture resolution being paged in slower than said fresh rows or columns of greater texture resolution;

an image system for processing said terrain representation data from said terrain storage and said selectively stored texel arrays from said active map memory system to provide image data signals, said image system texturing said circular ranges by blending between said arrays of appropriate adjacent levels corresponding to said circular ranges; and display means for providing said dynamic image in accordance with said image data signals wherein said active map memory system stores said actively-stored portions of said levels of texture as a truncated pyramid and said image system applies texture from said levels of texture data in accordance with ranges defined by annular rings relating projected pixel size to projected texel size.

4. A computer graphics system for producing a dynamic image of a continuous surface, as global terrain seen from a moving viewpoint, utilizing height field data or other terrain field representations and texture data for said terrain, comprising:

terrain storage for storing said terrain representation data;

texture storage for storing said texture data, said texture data configured in multiple independent levels of different texture resolution, said levels being continuous and directed to said terrain;

an active map memory system coupled to said texture storage for selectively storing portions of said levels of texture data with reference to said moving viewpoint, said actively-stored portions of said levels of texture data containing a common plurality of texels configured in rectangular arrays having rows and columns, said actively-stored portions of texels being of progressively reduced texture detail for progressively larger surface areas, said surface areas having a common point corresponding to said veiwpoint, but spanning progressively larger distances from said point;

a paging structure for independently refreshing said actively-stored portions with fresh texels at different rates for different levels while maintaining said actively-stored portions with said common plurality of texels;

an image system for processing said terrain representation data from said terrain storage and actively stored portions of said levels of texture from said active map memory system to provide image data signals; and display means for providing said dynamic image in accordance with said image data signals wherein said active map memory system stores said actively-stored portions of said levels of texture as a truncated pyramid and said image system applies texture from said levels of texture data in accordance with ranges defined by annular rings relating projected pixel size to projected texel size.

5. A system according to claim 4 wherein said image system applies texture to a terrain area in accordance with a range from said viewpoint to said terrain area.

6. A system according to claim 5 wherein said image system applies texture to said terrain area in accordance with an angle between said terrain area and said viewpoint.

7. A system according to claim 4 wherein said paging structure refreshes said rows and columns representative of locations within said image furthest from said viewpoint.

8. A system according to claim 4 wherein said paging structure pages in fresh texture data into said active map memory system, said fresh texture data of one of said levels for lower resolution but for greater surface area about said viewpoint being paged in at a slower rate and said fresh texture data of another of said levels for higher resolution but for lesser surface area about said viewpoint being paged in at a faster rate.

9. A system according to claim 4 wherein said actively-stored portions of plural map levels of texture data are independently updated at said different rates by said paging structure.

10. A system according to claim 4 wherein said paging structure for selectively refreshing said rows and columns provides said texture data relevant to said viewpoint.

11. A system according to claim 4 wherein said active map memory system further stores a synthetic representation of texture data.

12. A system according to claim 4 wherein said active map memory system further stores texture data including a set of two-dimensional data to alter the appearance of a surface on which it is mapped.

13. A system according to claim 4 wherein said active map memory system further stores theme cells for processing by said image system.

14. A computer graphics system for producing a dynamic image of a continuous surface, as global terrain seen from a moving viewpoint, utilizing height field data or other terrain field representations and texture data for said terrain, comprising:

terrain storage for storing said terrain representation data;

texture storage for storing said texture data, said texture data configured in multiple independent levels of different texture resolution, said levels being continuous and directed to said terrain;

an active map memory system coupled to said texture storage for selectively storing portions of said levels of texture data with reference to said moving viewpoint, said actively-stored portions of said levels of texture data containing a common plurality of texels configured in rectangular arrays having rows and columns, said actively-stored portions of texels being of progressively reduced texture detail for progressively larger surface areas, said surface areas having a common point corresponding to said viewpoint, but spanning progressively larger distances from said point;

a paging structure for independently refreshing said actively-stored portions with fresh texels at different rates for different levels while maintaining said actively-stored portions with said common plurality of texels;

an image system for processing said terrain representation data from said terrain storage and said actively stored portions of said levels of texture from said active map memory system to provide image data signals; and display means for providing said dynamic image in accordance with said image data signals wherein said active map memory system stores said actively-stored portions of said levels of texture as a truncated pyramid and said image system applies texture from said levels of texture data in accordance with ranges defined by annular rings relating projected pixel size to projected texel size.

* * * * *